Jan. 14, 1936.  H. M. CRANE  2,027,577
AUTOMOBILE SUSPENSION SYSTEM
Filed Feb. 14, 1935   2 Sheets—Sheet 1
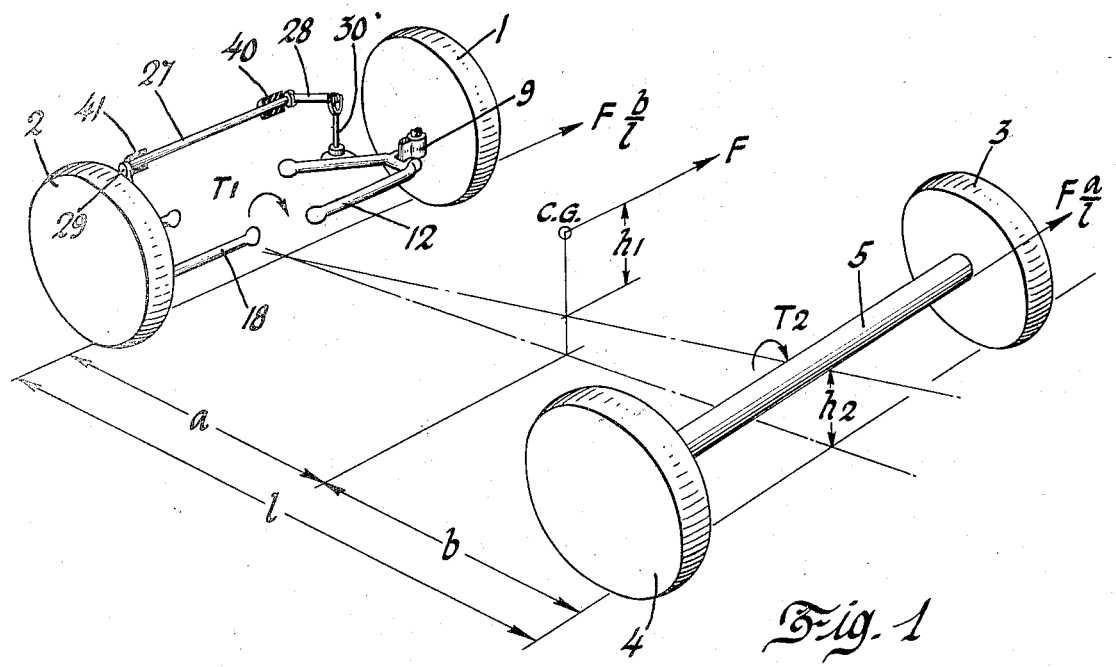
Fig. 1
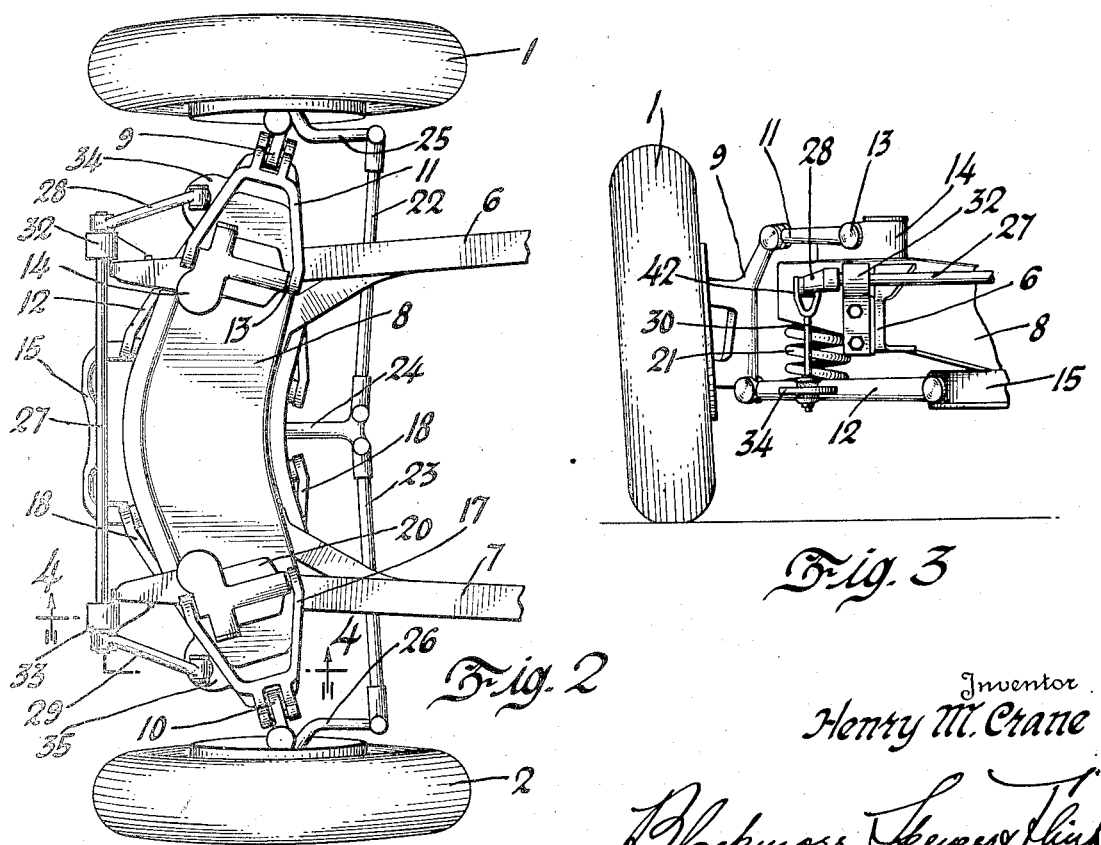
Fig. 2
Fig. 3
Inventor
Henry M. Crane
By Blackmore, Spencer & Flint
Attorneys Jan. 14, 1936.  H. M. CRANE  2,027,577
AUTOMOBILE SUSPENSION SYSTEM
Filed Feb. 14, 1935    2 Sheets-Sheet 2

Inventor
Henry M. Crane
By Blackmore, Spencer & Flint
Attorneys

Patented Jan. 14, 1936

2,027,577

UNITED STATES PATENT OFFICE 2,027,577

AUTOMOBILE SUSPENSION SYSTEM

Henry M. Crane, New York, N. Y., assignor to General Motors Corporation, New York, N. Y., a corporation of Delaware Application February 14, 1935, Serial No. 6,420

7 Claims. (Cl. 267—11)

This invention relates to motor vehicles or the like, in which the roll axis,—i. e., the axis about which the suspended part of the vehicle rolls under the influence of centrifugal force as when the vehicle is turning a corner,—is inclined from one end to the other of the vehicle and not parallel with the ground.

The suspension means at each end of the vehicle may be considered as applying the supporting forces in two longitudinally spaced transverse planes containing the tire contacts with the road. An instantaneous roll center can be found in each of these transverse planes, about which centers the suspended parts which are located close to these planes rotate at any instant during roll. The roll axis for the suspended part of the vehicle is a line joining the instantaneous centers in the two transverse planes.

Where an independent suspension is used in which the wheels are connected to the chassis by rigid links, and the suspension forces are applied directly to the road, the instantaneous centers of wheel motion and chassis rotation are the same. This common center may be located by drawing lines for each wheel perpendicular to the path of tire contact during a small wheel deflection. In general, the intersection of these lines for each wheel is the roll center. In the special case where the wheels move parallel to each other, the roll center is half way between the tire contacts at ground level.

In the conventional rigid axle suspension in which the spring forces normally act vertically against the chassis, and the spring forces react against a bridge which is itself supported by the ground, the roll center for the chassis is located at the height of the spring seats half way between them. A vehicle having a rigid axle at each end with the conventional spring arrangement will have a substantially horizontal roll axis.

When a vehicle is provided with a conventional suspension at one end and an independent suspension at the other, with the wheels of the independent suspension moving parallel to each other or having a motion nearly parallel to each other, the roll axis is considerably inclined, being lower at the end of the vehicle which has the independent suspension.

One object of the invention is to improve the cornering ability and stability of a motor vehicle having an inclined roll axis.

The above and other objects of the invention will be apparent as the description proceeds.

According to the invention, means operative only when forces tending to roll or rock the vehicle are provided between the vehicle frame and the longitudinally spaced supporting means such as the road wheels resiliently mounted thereon, whereby the total "rotary stiffness" or resistance to roll of the vehicle in the transverse plane of each of the supporting means, relative to the other supporting means, is inversely proportional to the rolling force couples carried by the respective supporting means, so that the control of rolling is carried equally by each of the spaced supporting means.

As will be shown later, that end of the vehicle at which the roll axis is farther from the ground carries the greater rolling couple, and therefore according to the invention, an anti-roll device or stabilizer is arranged between the vehicle frame and the wheels at that end of the vehicle at which the roll axis is closer to the ground, increasing the rotary stiffness at that end of the vehicle by resiliently constraining each of these wheels to move together, upwardly or downwardly relatively to the frame under the influence of spring deflecting forces at the road wheels.

The cornering ability of the tires, and hence of the vehicle, is dependent on the side thrust produced by a given "slip angle." The "slip angle" is the angle between the wheel planes and their direction of motion and must exist in order that the tires may develop enough side force to control the direction of motion in opposition to any lateral forces tending to deflect the vehicle from its prescribed direction of motion.

In cornering, when the tires to the outside of the curve are overloaded and those to the inside are underloaded by equal amounts, the cornering ability of the tires both to the outside and inside of the curve is reduced, the "slip angle" is increased and increases most at that end of the vehicle which carries the greater rolling couple. It is obvious, therefore, that the least loss of cornering ability is obtained when the difference in loading of the tires to the outside and inside of the curve is kept at a minimum and when the control of rolling is carried equally on front and rear tires.

The control of rolling is carried equally on front and rear tires in a four-wheeled motor vehicle having an inclined roll axis when the rotary stiffness at that end of the vehicle at which the roll axis is closer to the ground is greater than the rotary stiffness at the other end of the vehicle to an extent depending on the inclination of the roll axis and the relative spring deflections front and rear.

In a vehicle having equal spring deflections front and rear, some means of increasing the rotary stiffness at that end of the vehicle towards which the roll axis is downwardly inclined would be required in order to make the rotary stiffness at the ends of the vehicle inversely proportional to the rolling force couples carried by the respective ends. Such means are still more necessary if the front spring deflections are greater than the rear spring deflections.

Motor vehicles with independent suspension of the front wheels and a rigid rear axle and having a roll axis downwardly inclined towards the front end have recently been constructed, in order to permit of the use at the front end of the vehicle of softer springs with greater deflections to improve the riding comfort of the vehicle. This has reduced the rotary stiffness of the front end of the vehicle because of the softer springs, making it necessary to apply still further means to increase the rotary stiffness at that end of the vehicle if the control of rolling is to be borne equally front and rear. Furthermore, in such vehicles and to the extent that the independently sprung wheels roll as the vehicle rolls in cornering, the "camber thrust" of each wheel, which is a force in the direction in which the wheel leans, is increased. This increases the "slip angle" of the front wheels. The increased slip angle of the front wheels has resulted in excessive wear of the tires of the front wheels; the self-straightening torque about the king pin, and the steering effort required to put the car into a turn, have been too great; and there has been a tendency to front end skids. Stabilizers or anti-roll devices of the torsion rod type have been applied to the rigid rear axle in an attempt to diminish roll. This has had the effect, however, of increasing the "slip angle" at the rear of the vehicle, by increasing the tendency for the rigid rear axle and its wheels to roll with the body and thus initiating a "camber thrust" in the direction of increased "slip angle". As compared with a conventional motor vehicle having a rigid axle at front and rear, the "slip angle" of both front and rear wheels has been increased, resulting in a greatly increased rate of tire wear both front and rear. When, in addition, the "slip angle" of the rear wheels has been greater than the "slip angle" of the front wheels, the vehicle has been unstable with a tendency to over-steer, and a tendency to rear end skids.

According to the present invention, a stabilizer or anti-roll device has been applied to a vehicle having an inclined roll axis in a manner reducing the "slip angle" of the wheels while still providing for a "slip angle" of the front wheels slightly greater than the "slip angle" of the rear wheels— for stability, in contradistinction to contemporary practice where it has been applied in a manner increasing the "slip angle" and contributing to instability.

The accompanying drawings show the application of the invention to a motor vehicle having independent suspension of the front dirigible wheels, of the "transverse parallelogram" type, and a rigid rear axle. The roll axis is below the horizontal plane of the center of gravity and is inclined downwards from the height of the springs at the rear towards ground level at the front.

In the drawings:

Figure 1 is a diagrammatic representation of a motor vehicle having an inclined roll axis and showing the manner in which the forces due to centrifugal force acting at the center of gravity of the vehicle when the vehicle is cornering, are distributed as between the front and rear wheels.

Figure 2 is a plan view of the front end of the vehicle shown diagrammatically in Figure 1, having independent suspension of the front wheels of the "transverse parallelogram" type and a rigid rear axle. It shows the application to the front wheels, of an anti-roll device or stabilizer of the torsion rod type.

Figure 3 is an end elevation of a part of Figure 2.

Figure 4:
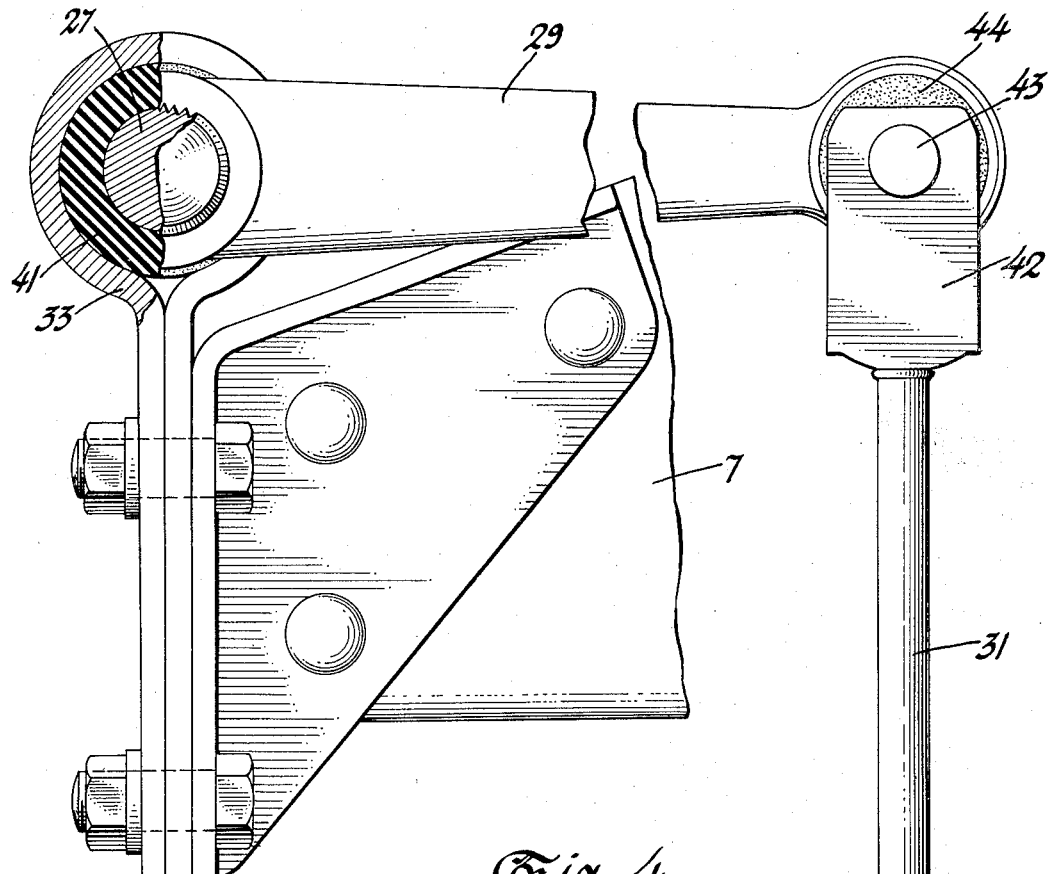
Figure 4 is an enlarged detail view taken on line 4—4 of Figure 2 and showing the linkage between the torsion rod on the vehicle frame and the lower pivotal link of the wheel supporting "parallelogram" linkage system.

1 and 2 are the dirigible front wheels, and 3 and 4 are the rear wheels respectively of the vehicle.

The dirigible road wheels 1 and 2 are independently suspended while the rear wheels are mounted on a rigid rear axle 5.

6 and 7 are the side members of the vehicle frame which is provided with a front cross member 8.

The dirigible road wheels 1 and 2 are each carried respectively on wheel supporting members 9 and 10 which may be knuckle bracket support members 9 and 10.

The knuckle bracket support member 9 is pivotally mounted between the outer ends of the upper and lower laterally extending links 11 and 12—V-shaped in plan, which are pivoted one above the other to the frame, so as to be capable of swinging motion in a substantially vertical plane.

The upper support link 11 has its spaced apart legs keyed or otherwise suitably fixed to the actuating spindle 13 of a shock absorber 14 rigidly fixed to the front cross member 8, while the lower support link 12 is pivoted to an anchor plate 15 bolted to the underside of the cross member 8.

The knuckle bracket support member 10 is similarly mounted between the outer ends of upper and lower laterally extending links 17 and 18, of which the upper link 17 is fixed to the actuating spindle of a shock absorber 20 rigidly fixed to the front cross member 8, while the lower support link 18 is pivoted to the anchor plate 15.

Coil springs such as 21 interposed between the frame cross member 8 and the links 12 and 18, resiliently restrain upward swinging movement of the linkages relatively to the frame.

Dirigible movement of the wheels 1 and 2 is effected through the medium of tie rods 22 and 23 between a T-headed lever 24 connected to the steering gear (not shown) and steering arms 25 and 26 on each respective wheel.

Between the wheels 1 and 2 and the frame of the vehicle is an anti-roll device or stabilizer which consists of a rod 27 suitably supported in bearings on the vehicle frame and to the ends of which lever arms 28 and 29 are rigidly fixed, whose ends remote from the rod are connected through links 30 and 31 to the support links 12 and 18 respectively, so as to partake of the movement of the wheels 1 and 2 relatively to the frame.

The wheels 1 and 2 move upwardly or downwardly, together relatively to the frame, to an extent depending on the torsional rigidity of the rod 27.

The links 30 and 31 are pivotally connected to the lever arms 28 and 29 by a link pin and to the support links 12 and 18 through a universal joint.

As shown in Figures 2, 3 and 4, and diagrammatically in Figure 1, the rod 27 is supported in bearing brackets 32 and 33 fixed to the front ends of the frame side member 6 and 7 respectively, forwardly of the wheels, the links 30 and 31 being connected to lugs 34 and 35 on the forward legs of the lower support links 12 and 18.

Figure 5:
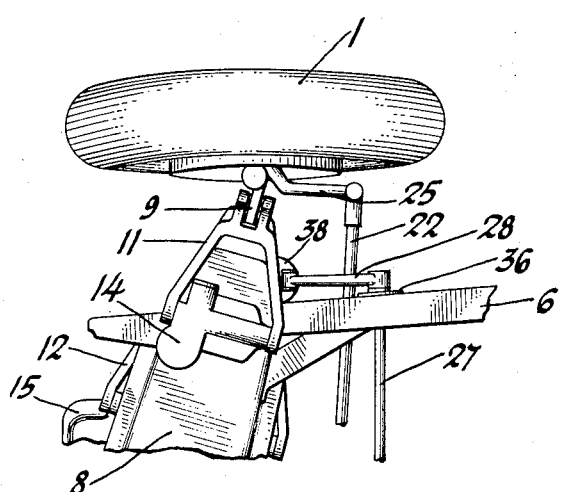
Figure 5 is a plan view showing an alternative and preferred position of the torsion rod on the vehicle frame.

In the arrangement according to Figure 5, the rod 27 is supported in bearing brackets such as 36 fixed to the frame side members rearwardly of the wheels, at a stiffer section of the frame, the links 30 or 31 being connected to lugs such as 38 on the rearward legs of the lower support links 12 or 18.

As shown most clearly in Figure 4, each lever arm 28 or 29 engages serrations on the end of the rod 27. A rubber bushing 40 or 41 is provided between the rod 27 and each of the bearing brackets such as 33. Each link 30 or 31 is provided with a stirrup end such as 42, pivotally connected to the lever arm 28 or 29 through a link pin such as 43. A rubber bushing 44 is provided between each link pin such as 43 and the lever arms 28 or 29.

The universal joint between each link 30 or 31 and the support links 12 or 18 consists of a pair of rubber cushions 45 and 46 having seatings on opposite sides of the lugs such as 35 on the support links, and clamped between seatings 47 and 48 on each link 30 or 31 which is threaded through the seatings, the rubber cushions, and the lug, with clearance through a hole such as 49 in the latter.

Referring now to Figure 1, when the vehicle is turning a corner, the centrifugal force F acting at the center of gravity C. G. has a moment $Fh_1$ about the roll axis which at the front end of the vehicle is at ground level,—it being assumed that the front wheels move in planes parallel to the normally vertical longitudinal mid-plane of the vehicle—and at the rear end of the vehicle is approximately at the height of the rear spring pads. The centrifugal moment $Fh_1$ is resolved into a shear force $$F\frac{b}{l}$$

at the front tires, and a lateral force $$F\frac{a}{l}$$

on the rear axle, where $l$ is the length of the wheelbase and $a$ and $b$ are the distances of the front and rear wheels respectively from the center of gravity.

That proportion of the rolling couple borne by the front tires is $$Fh_1 \times \frac{T_1}{T_1+T_2}$$

where $T_1$ and $T_2$ represent the "rotary stiffness" or the resistance to rolling at the front and rear of the vehicle respectively. The total couple to be borne by the rear tires is $$Fh_1 \times \frac{T_2}{T_1+T_2} + Fh_2\frac{a}{l}$$

where $$Fh_2\frac{a}{l}$$

is the couple due to the force $$F\frac{a}{l}$$

which has a moment arm $h_2$ about the contact line of the rear tires with the ground. Assuming that $h_1$ is 1½ times $h_2$ and that the center of gravity is central, as is approximately the case in modern motor vehicles, then, if $T_1$ and $T_2$ are equal, the ratio of the rolling couple borne by the front tires to the rolling couple borne by the rear tires is as 3 is to 5. If the control of rolling is to be borne equally by front and rear tires, $T_1$ must then equal approximately twice $T_2$.

Expressed otherwise, a modern motor vehicle having a roll axis inclined downwards towards the front end of the vehicle should have a rotary stiffness or resistance to roll at the front end of the vehicle greater than the resistance to roll at the rear end of the vehicle, and in the foregoing example in the ratio of approximately two to one.

As shown, the torsion rod 27 provides the desirable increased rotary stiffness at the front end of the vehicle and functions by under and overloading the front wheels by transmitting the spring pressure on the wheel to the inside of the curve to the wheel to the outside of the curve to an extent dependent on the torsional rigidity of the rod.

It will be seen, therefore, that the invention contemplates the application to a motor vehicle of an anti-roll device at that end thereof towards which the roll axis is downwardly inclined and which may or may not necessarily have a softer suspension than the other end of the vehicle.

When a stabilizer or anti-roll device is applied, in accordance with the invention, to the front axle for instance, the following are the resulting advantages: It reduces the tendency to rear wheel skids because the control of rolling is borne equally between front and rear wheels and the "slip angle" of the rear wheels is not increased; it improves cornering ability because of reduced "camber thrust" to the outside of the curve which the vehicle may be negotiating; it reduces the wear on the front tires by reducing the "slip angle"; the stability is improved because the front wheel "slip angle" while being reduced by the anti-roll device can still be slightly greater than the rear wheel "slip angle"; the steering effort required is lighter because the self-straightening torque about the king pin of the front wheels and due to camber and slip angle is reduced; there is less "fight" from the front wheels because they have less tendency to leave the ground; and there is a quicker response to steering movements of the steering wheel, because the "slip angle" of the front wheels has been reduced and as compared with a vehicle having an anti-roll device applied to a rigid rear axle, the "slip angle" of the rear wheels has not been increased. Furthermore, when braking during roll, the transfer of load from rear to front wheels reduces the effectiveness of the rear wheels in resisting roll, whether or not a stabilizer is provided between the rear wheels; a stabilizer between the front wheels does not have its effectiveness reduced in such circumstances.

I claim:

1. In a motor vehicle having a frame, a rigid axle between a pair of wheels at one end of the vehicle, and independent suspension of a pair of wheels at the other end of the vehicle, the roll axis being inclined downwards towards that end of the vehicle having the independently suspended wheels, anti-roll stabilizing means between the frame and the independently suspended wheels whereby the control of rolling is borne equally between the front and rear road wheels.

2. A motor vehicle according to claim 1 in which the anti-roll stabilizing means consists of a rod, suitably supported in bearings and with connections from spaced points thereof interconnecting the relatively movable frame of the vehicle and the independently suspended wheels, resiliently constraining the said wheels to move upwardly and downwardly together relatively to the frame, to an extent depending on the torsional rigidity of the rod.

3. In a motor vehicle having a frame, a rigid rear axle between the two rear wheels and independent suspension of the front wheels, the roll axis being inclined downwards towards the front end of the vehicle, anti-roll stabilizing means between the frame and the independently suspended wheels, whereby the control of rolling is borne equally between the front and rear road wheels.

4. A motor vehicle according to claim 3 in which the anti-roll stabilizing means consists of a rod suitably supported in bearings on the vehicle frame and with connections from spaced points thereof to the independently suspended wheels, resiliently constraining the said wheels to move upwardly and downwardly together relatively to the frame, to an extent depending on the torsional rigidity of the rod.

5. In a vehicle having a frame resiliently supported at longitudinally and transversely spaced points thereof and in which the roll centers of the suspended parts of the vehicle about each of the longitudinally spaced supporting means do not lie on a line parallel with the ground, the rolling force couples in planes containing the supporting means at right angles to the longitudinal axis of the vehicle being unequal, a device increasing the stiffness of the resilient means, between the vehicle frame and each supporting means carrying less than the rolling force couple of the supporting means carrying the greatest rolling force couple, on that side of the vehicle towards which the vehicle rolls, and operative only when forces tending to roll or rock the vehicle are operative, increasing the rotary stiffness of the vehicle in the said planes of the supporting means subjected to less than the rolling force couple of that supporting means subjected to the greatest rolling force couple, whereby the control of rolling is shared equally between all of the spaced supporting means capable of carrying any rolling force couple.

6. In a vehicle having a frame resiliently supported at longitudinally and transversely spaced points thereof and in which the roll centers of the suspended parts of the vehicle about each of the longitudinally spaced supporting means do not lie on a line parallel with the ground, the rolling force couples in planes containing the supporting means at right angles to the longitudinal axis of the vehicle being unequal, a rod between the vehicle frame and each transversely spaced supporting means carrying less than the rolling force couple of the supporting means carrying the greatest rolling force couple, suitably supported in bearings, and having connections from spaced points thereof inter-connecting the relatively movable frame of the vehicle and the said transversely spaced supporting means carrying less than the greatest rolling force couple, resiliently constraining the said transversely spaced supporting means to move upwardly and downwardly together relatively to the frame, to an extent depending on the torsional rigidity of the rod, thereby increasing the rotary stiffness of the vehicle in the said planes of the supporting means carrying less than the greatest rolling force couple, whereby the control of rolling is shared equally between all of the spaced supporting means capable of carrying any rolling force couple.

7. In a motor vehicle in which the roll axis is inclined from one end to the other of the vehicle, a rod between the vehicle frame and the wheels at that end of the vehicle towards which the roll axis is downwardly inclined, suitably supported in bearings and having connections from spaced points thereof inter-connecting the relatively movable frame of the vehicle and the said wheels, resiliently constraining the said wheels to move upwardly and downwardly together relatively to the frame, to an extent depending on the torsional rigidity of the rod, and operative only when forces tending to roll or rock the vehicle are operative, thereby increasing the rotary stiffness of that end of the vehicle to an extent dependent on the inclination of the roll axis and the normal relative spring deflection front and rear.

HENRY M. CRANE.